United States Patent
Emig et al.

(10) Patent No.: US 10,240,665 B2
(45) Date of Patent: Mar. 26, 2019

(54) SYSTEMS AND METHODS FOR TENSIONING A BELT OF A BELT DRIVE OF AN INTERNAL COMBUSTION ENGINE

(71) Applicant: Ford Global Technologies, LLC, Dearborn, MI (US)

(72) Inventors: Tobias Emig, Gelsenkirchen (DE); Donatus Andreas Josephine Kees, Billericay (GB); Claus Maerschank, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 15/405,248

(22) Filed: Jan. 12, 2017

(65) Prior Publication Data
US 2017/0204945 A1   Jul. 20, 2017

(30) Foreign Application Priority Data
Jan. 20, 2016   (DE) ................. 10 2016 200 680

(51) Int. Cl.
*F16H 7/02*   (2006.01)
*F16H 7/08*   (2006.01)
(Continued)

(52) U.S. Cl.
CPC ........... *F16H 7/1281* (2013.01); *F02B 67/06* (2013.01); *F16H 7/02* (2013.01);
(Continued)

(58) Field of Classification Search
CPC ............ F16H 7/1281; F16H 7/02; F16H 7/08; F16H 7/14; F16H 2007/0806; F02B 67/06; F02N 11/0851; F02N 11/0855; F02N 11/04; F02N 11/006; F02N 19/00; F02N 19/004; F02N 19/005; F02N 15/02; F02N 15/08
See application file for complete search history.

(56) References Cited

U.S. PATENT DOCUMENTS 4,973,290 A * 11/1990 Hans ............... F16H 7/0834
                                                           474/117
2014/0130635 A1 * 5/2014 Kees ................ F02N 11/006
                                                           74/7 R
(Continued)

FOREIGN PATENT DOCUMENTS

DE   102006025376 A1   12/2006
DE   102008021257 A1   11/2009

*Primary Examiner* — George C Jin
(74) *Attorney, Agent, or Firm* — Julia Voutyras; McCoy Russell LLP (57) ABSTRACT

Methods and systems are provided for tensioning a belt of a belt drive of an internal combustion engine. In one example, a movable tensioning means assigned to an active tensioner is provided, which applies a force to a belt of a belt drive, and the active tensioner is controlled such that a compression of a spring of the tensioner is at least countered, so that a movement of the tensioning means under the load of the belt is at least hindered. The belt is then excited to vibration in a contact zone between the belt and the movable tensioning means by use of a starter so that the tensioning means exposed to the force of the spring is moved further in the direction of the belt under expansion of the spring, whereby the belt is tensioned.

15 Claims, 4 Drawing Sheets

(51) Int. Cl.
*F16H 7/12* (2006.01)
*F02B 67/06* (2006.01)

(52) U.S. Cl.
CPC ............... *F16H 2007/0806* (2013.01); *F16H 2007/0823* (2013.01); *F16H 2007/0865* (2013.01); *F16H 2007/0885* (2013.01); *F16H 2007/0893* (2013.01)

(56) References Cited

U.S. PATENT DOCUMENTS

| | | | |
|---|---|---|---|
| 2015/0167796 A1* | 6/2015 | Noguchi | F16H 7/1281 477/3 |
| 2015/0167797 A1* | 6/2015 | Noguchi | F16H 7/1281 477/3 |
| 2016/0160830 A1* | 6/2016 | Noguchi | F02N 11/04 123/179.25 |
| 2017/0343083 A1* | 11/2017 | Wright | F02B 63/04 |

* cited by examiner

SYSTEMS AND METHODS FOR TENSIONING A BELT OF A BELT DRIVE OF AN INTERNAL COMBUSTION ENGINE

CROSS REFERENCE TO RELATED APPLICATION

The present application claims priority to German Patent Application No. 102016200680.0, filed on Jan. 20, 2016. The entire contents of the above-referenced application are hereby incorporated by reference in its entirety for all purposes.

FIELD

The current description relates to tensioning a belt of a belt drive of an internal combustion engine including an integrated starter-generator (ISG).

BACKGROUND\SUMMARY

An integrated starter-generator (ISG) serves as both a starter motor for an interncal combustion engine (ICE) and as an alternator. Thus, an ISG provides both additional torque to an engine when needed, and supplies electrical power to an electrical system of a vehicle. In automatic vehicle start-stop systems, ISGs are used for restarting the engine from a temporary stop.

ISGs may drive rotation of the engine via a mechanical coupling, such as a belt. Hydraulic belt tensioners are typically included to maintain the tension of the belt. During engine operation, a spring included in the hydraulic tensioner automatically increases belt tension whenever there is a loss in belt tension. However, during an engine start, the belt tension must be high enough for the ISG to provide the requisite starting torque to the engine. Thus, prior to commanding an engine stop, an engine controller may first ensure that the belt tension is sufficiently high such that the engine can be started during a subsequent engine start.

However, the inventors herein have recognized potential issues with such systems. As one example, when the engine stops unexpectedly, such as during an engine stall, the tensioner cannot be pre-emptively primed to the high tension mode. While the engine is off, belt tension cannot be increased because the spring force of the tensioner is alone not sufficient to increase belt tension. If the belt tension is too low to start the engine at the time of the engine stop, the engine may not restart.

In one example, the issues described above may be at least partially addressed by a method for tensioning a belt of a belt drive of an internal combustion engine not in operation and having a crankshaft, in addition to the belt as a traction means a first driving wheel arranged on the crankshaft and a third wheel arranged on a shaft of a starter assigned to the belt drive, wherein the belt is guided around the driving first wheel and the third wheel, and a movable tensioning means assigned to an active tensioner is provided, which engages in the belt under application of force by a spring, forming a contact zone, and applies tensile forces to the belt along its longitudinal axis for tensioning, comprising, controlling the active tensioner such that a compression of the spring is at least countered, so that a movement of the tensioning means under the load of the belt is at least hindered, and then exciting the belt to vibration in the contact zone by use of the starter so that the tensioning means, exposed to the force of the spring, is moved further in the direction of the belt under expansion of the spring, whereby the belt is tensioned. Thus, by vibrating the belt, the belt can be repeatedly relaxed and tightened to induce expansion of the tensioner spring and thus tightening of the belt.

In another example, a method for an engine system comprises, during an engine stop, pulsing a starter motor to relax a belt of a belt drive around a tensioner pulley of the belt drive and induce extension of a tensioner spring.

In another example, an engine system comprises a starter motor, and a controller with computer readable instructions stored in non-transitory memory for: prior to an engine start, varying an amount of power supplied to the starter motor to induce vibration of a belt of a belt drive of the engine system when a tension of the belt is less than a threshold.

In this way, belt tension during an engine stop may be increased, and therefore engine start failures may be reduced. In particular belt tension may be increased by vibrating the belt via torque oscillations of the starter motor, and inducing a tensioner spring to extend and push a tensioner pulley into the belt, thereby reducing the area enclosed by the belt (e.g., increasing the winding of the belt).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and method for tensioning a belt of a belt drive of an internal combustion engine prior to an engine start. An engine system, such as the engine system of FIG. 1, includes a crankshaft which converts power output from reciprocating engine pistons, into rotational motion for one or more vehicle wheels. The crankshaft may be mechanically coupled via a belt drive, such as the example belt drive of FIG. 2A, to one or more vehicle accessories such as an alternator, A/C compressor, front end accessory drive (FEAD), etc., for powering the accessories.

Figure 2A:
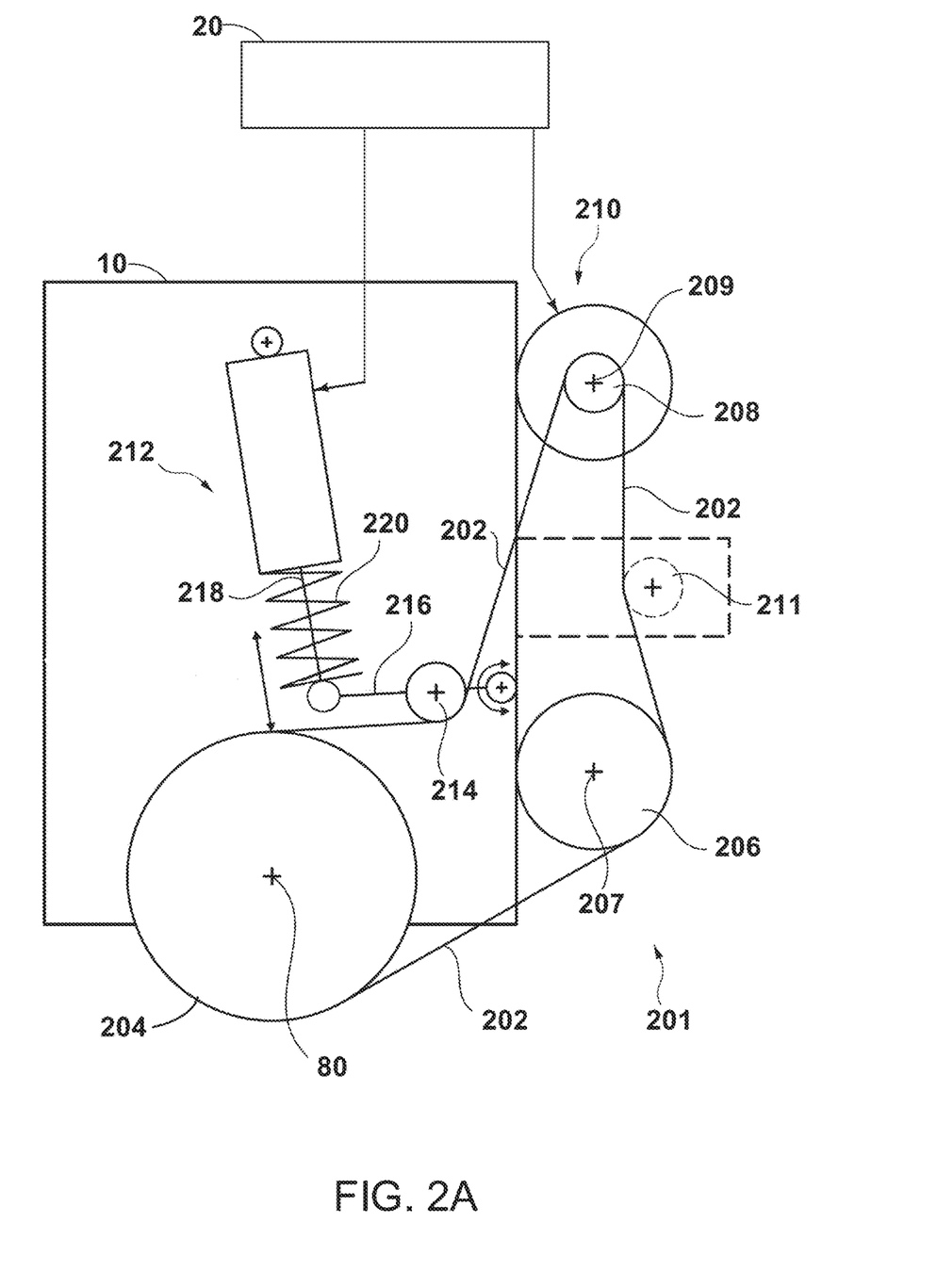
FIG. 2A shows a schematic diagram of a belt drive of an engine system, such as the engine system of FIG. 1, in accordance with an embodiment of the present disclosure.
Figure 2B:
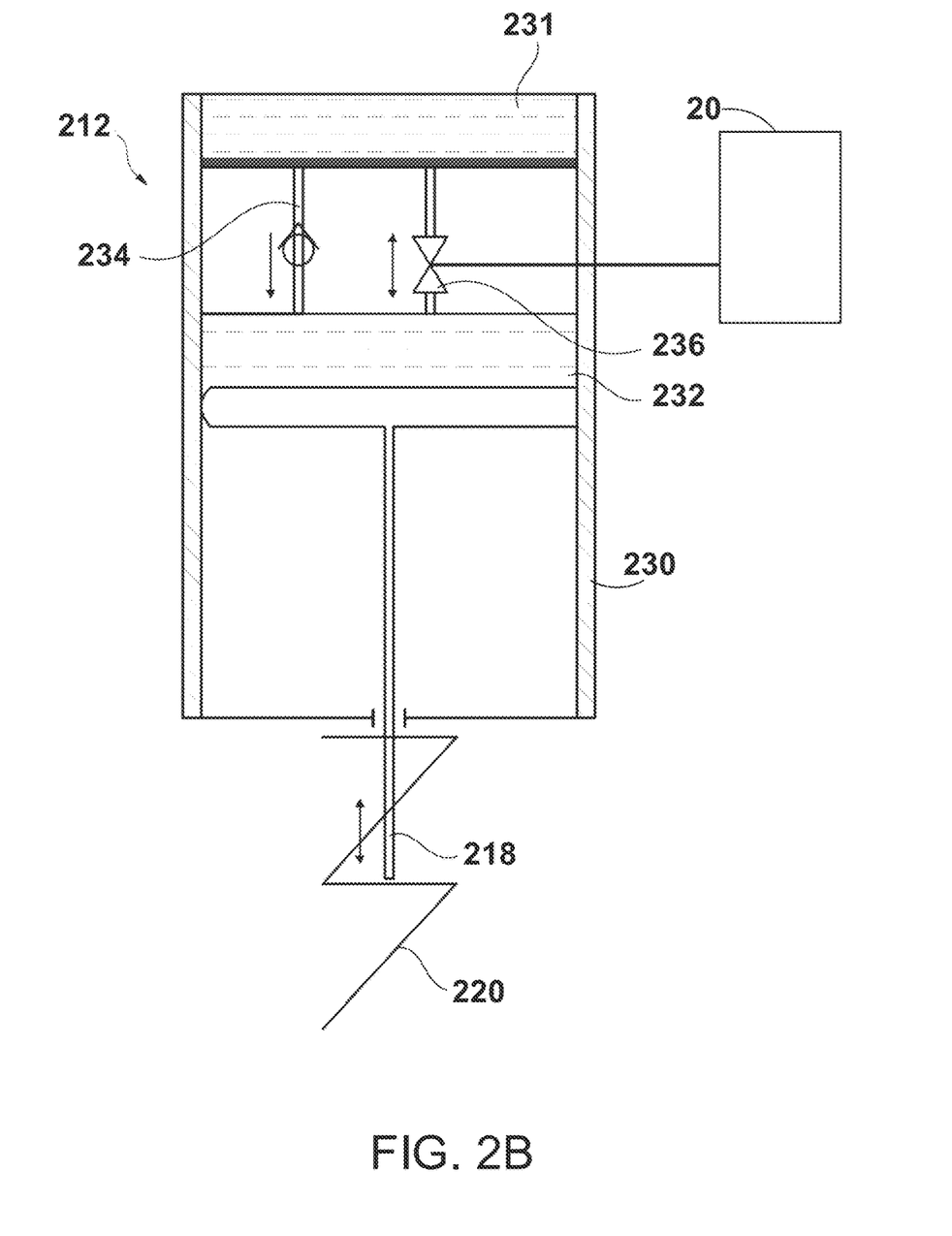
FIG. 2B shows a schematic diagram of a belt tensioner of the belt drive of FIG. 2A, in accordance with an embodiment of the present disclosure.

In automatic start/stop vehicles, the engine may be restarted by an integrated starter-generator (ISG). The ISG may drive rotation of the engine via the belt drive. An automatic belt tensioner, such as the hydraulic belt tensioner shown in FIG. 2B, is included to maintain belt tension. The belt tensioner may include a spring that is biased towards increasing belt tension. However, the biasing force of the spring may not be sufficient to increase belt tension unless the belt is oscillating and the belt tension is changing. Thus, the spring may only expand and add tension to the belt when the belt flutters and belt tension decreases. Fluid, such as oil, may then flow into a holding chamber of the tensioner to hold the position of the spring in the new, more extended position. In this way, the hydraulic belt tensioner may dampen belt vibrations and increase belt longevity.

However, the tensioner may not be actively controlled to increase belt tension. That is, the belt tensioner passively and automatically increases belt tension during engine operation via the spring if the belt loses tension, such as when the belt stretches. During normal start/stop operation, an engine controller locks the belt tensioner, so that the belt tension during a subsequent engine start is sufficient to start the engine. However, in some examples, such as during engine stall, the engine stops unexpectedly, and the controller may be unable to properly tension the belt prior to the engine shutdown. In such examples, if the belt tension at the time of the engine stop is less than is needed to restart the engine, the ISG or starter motor may be unable to restart the engine because the belt tensioner is unable to increase belt tension while the engine is off.

Thus, the ISG may be operated during an engine stop to vibrate and/or flutter the belt of the belt drive so that the belt tensioner can naturally increase belt tension, as it would during engine operation. For example, FIG. 3 describes an example method for increasing belt tension while the engine is not running by adjusting operation of the ISG.

Figure 1:
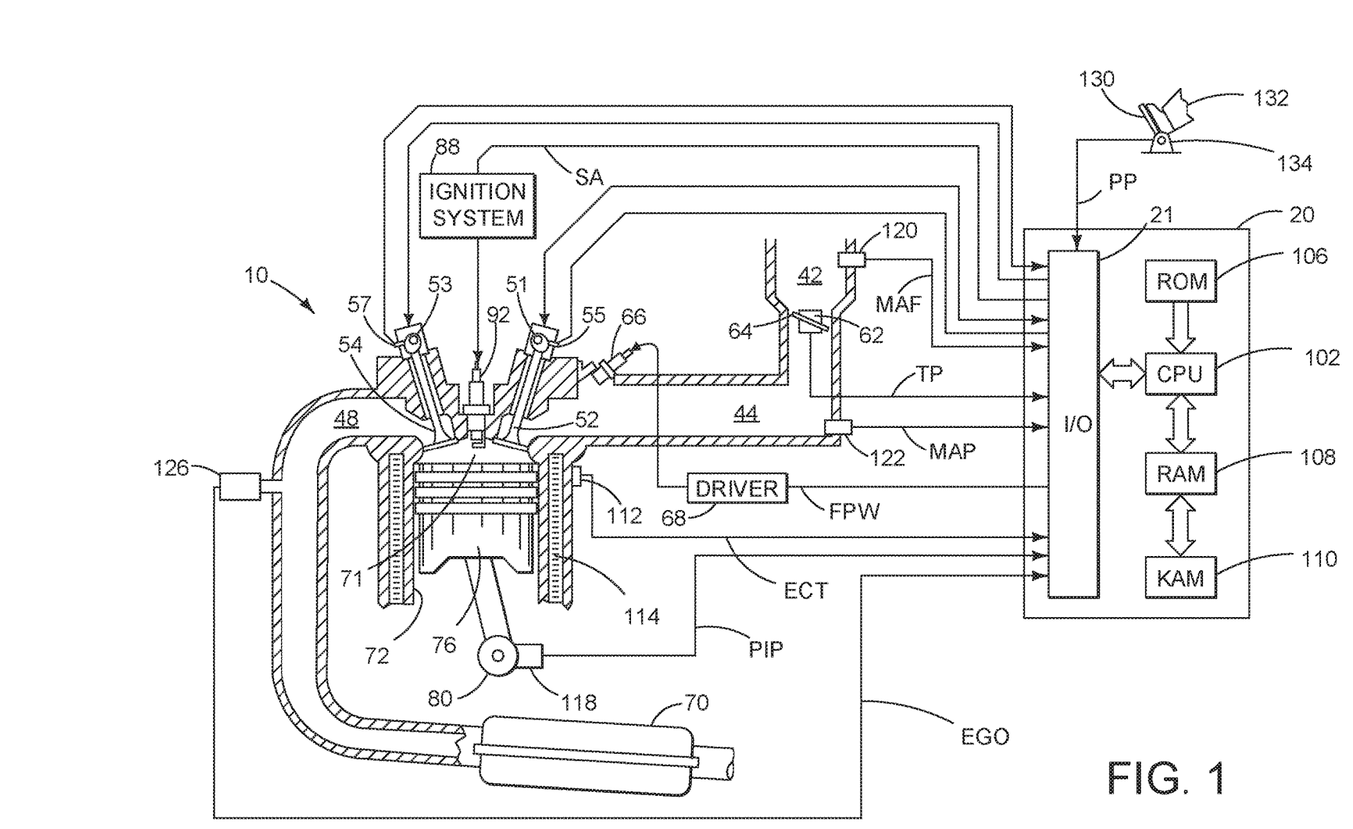
FIG. 1 shows a schematic diagram of an example engine system, in accordance with an embodiment of the present disclosure.

Referring to FIG. 1, a schematic diagram showing one cylinder of multi-cylinder engine 10, which may be included in a propulsion system of an automobile, is illustrated. Engine 10 may be controlled at least partially by a control system including controller 20 and by input from a vehicle operator 132 via an input device 130. In this example, input device 130 includes an accelerator pedal and a pedal position sensor 134 for generating a proportional pedal position signal PP. Combustion chamber (i.e., cylinder) 71 of engine 10 may include combustion chamber walls 72 with piston 76 positioned therein. Piston 76 may be coupled to crankshaft 80 so that reciprocating motion of the piston is translated into rotational motion of the crankshaft. Crankshaft 80 may be coupled to at least one drive wheel of a vehicle via an intermediate transmission system. Further, a starter motor may be coupled to crankshaft 80 via a flywheel to enable a starting operation of engine 10. For example, an ISG may be coupled to the crankshaft via a FEAD belt, which may have a passive tensioner as depicted in FIGS. 2A-2B.

The vehicle including the engine 10 may be configured as a start/stop vehicle, where the ISG may be used to restart the engine 10 during an engine stop. The controller 20 may initiate an engine stop when a driver demanded torque and/or anticipated engine speed decrease below a threshold, for example when a vehicle is stopped at a stoplight. The controller 20 may restart the engine via the ISG in response to an increase in driver demanded torque, such as from a depression of the input device 130.

Combustion chamber 71 may receive intake air from intake manifold 44 via intake passage 42 and may exhaust combustion gases via exhaust passage 48. Intake manifold 44 and exhaust passage 48 can selectively communicate with combustion chamber 71 via respective intake valve 52 and exhaust valve 54. In some embodiments, combustion chamber 71 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 20 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 71 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 71. Fuel injector 66 may inject fuel in proportion to the pulse width of signal FPW received from controller 20 via electronic driver 68. Fuel may be delivered to fuel injector 66 by a fuel system (not shown) including a fuel tank, a fuel pump, and a fuel rail. In some embodiments, combustion chamber 71 may alternatively or additionally include a fuel injector coupled directly to combustion chamber 71 for injecting fuel directly therein, in a manner known as direct injection.

Intake passage 42 may include a throttle 62 having a throttle plate 64. In this particular example, the position of throttle plate 64 may be varied by controller 20 via a signal provided to an electric motor or actuator included with throttle 62, a configuration that is commonly referred to as electronic throttle control (ETC). In this manner, throttle 62 may be operated to vary the intake air provided to combustion chamber 71 among other engine cylinders. The position of throttle plate 64 may be provided to controller 20 by throttle position signal TP. Intake passage 42 may include a mass air flow sensor 120 and a manifold air pressure sensor 122 for providing respective signals MAF and MAP to controller 20.

Ignition system 88 can provide an ignition spark to combustion chamber 71 via spark plug 92 in response to spark advance signal SA from controller 20, under select operating modes. Though spark ignition components are shown, in some embodiments, combustion chamber 71 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 20 is shown in FIG. 1 as a microcomputer, including microprocessor unit 102, input/output ports 21, an electronic storage medium for executable programs and calibration values shown as read only memory chip 106 in this particular example, random access memory 108, keep alive memory 110, and a data bus. Controller 20 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 80; throttle position (TP) from a throttle position sensor; and absolute manifold pressure signal, MAP, from sensor 122 and from sensors on the passive tensioner device on the FEAD belt, as shown in FIGS. 3A and 3B. Engine speed signal, RPM, may be generated by controller 20 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory chip 106 can be programmed with computer readable data representing instructions executable by processor 20 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

As described in greater detail below with reference to FIG. 2A, the controller may be electrically coupled to the ISG for adjusting operation of the ISG. During an unexpected engine stop, such as during an engine stall, the controller may pulse the ISG to cause the belt of the belt drive to oscillate and/or flutter. Vibrating the belt prior to an engine start, may allow the hydraulic tensioner to extend, and thereby increase the belt tension to a level sufficient to start the engine.

In this way, a method for tensioning a belt of a belt drive of an internal combustion engine not in operation and having a crankshaft, comprising in addition to the belt as a traction means a first driving wheel arranged on the crankshaft and a third wheel arranged on a shaft of a starter assigned to the belt drive, wherein the belt is guided around the driving first wheel and the third wheel, and a movable tensioning means assigned to an active tensioner is provided, which engages in the belt under application of force by a spring, forming a contact zone, and applies tensile forces to the belt along its longitudinal axis for tensioning.

An internal combustion engine of said type is used as a motor vehicle drive. In the context of the present invention, the term "internal combustion engine" includes diesel engines and petrol engines, but also hybrid combustion engines which use a hybrid combustion process, and hybrid drives which, as well as the internal combustion engine, comprise an electrical machine which can be connected for drive purposes to the internal combustion engine, receives power from the internal combustion engine or emits additional power as a switchable auxiliary drive.

A belt drive of the type cited initially is used for example in a motor vehicle. Part of the power obtained by the chemical conversion of fuel in the internal combustion engine is used to drive the ancillary devices necessary for operation of the internal combustion engine and the motor vehicle, in particular the injection pump, oil pump, coolant pump, alternator and similar, or the valve gear camshafts necessary for controlling the valves.

As well as belt drives, chain drives are used for this in which a chain is used as the traction means instead of the belt. In the context of the present invention, a belt drive is considered.

The belt drive should transmit a high torque from the crankshaft to the ancillary devices, in particular the camshafts and the injection pump, with the minimum possible energy losses and as little maintenance cost as possible, by retensioning. Frequently, the drive of several ancillary devices is combined in one belt drive.

To keep the belt under tension and hence guarantee as safe and wear-free a drive as possible, at suitable points of the belt drive a tensioner is provided which applies a force to the belt by intervention transverse to the running direction, so that the belt is constantly held under tension. This is unavoidable for the secure transmission of a sufficiently high torque or drive moment, in particular to avoid a slippage of the belt, i.e. to guarantee a slip-free drive.

Wear of the belt is a continuous process which is perceptible inter alia in that the length of the belt continuously increases. A tensioner of the type described continuously reacts to this wear-induced length change of the belt during operation and despite the length change continues to hold the belt under tension.

Tensioners of the type described eliminate the need to retension the belt during maintenance work, in particular during service, so the maintenance intervals can be extended.

Nonetheless, there are further aspects and defects which must be taken into account in connection with the use of belt drives in internal combustion engines.

Increasingly often, belt drives of the type described are equipped with a so-called active tensioner and a starter assigned to the belt drive. The active tensioner may for example be configured as an electrohydraulic tensioner, but also as a pneumatic, mechanical or piezo-electric tensioner.

An electrohydraulic tensioner comprises a movable tensioning means, for example a wheel, which is received rotatably by a pivotable lever mounted fixedly to the engine at one end and at its other end is connected freely pivotably to a spring rod. The spring rod, movable in translation, receives a spring which applies force to the tensioning means or wheel such that the tensioning means or wheel engages in the belt, forming a contact zone, and tensions the belt.

This spring rod, movable in translation, is mounted in a housing of the tensioner, wherein at least two hydraulic chambers are provided in the housing which can be connected via a check valve and a solenoid valve. The check valve allows the flow of hydraulic oil in one direction only, namely from a first hydraulic chamber to a second hydraulic chamber which is arranged on the spring rod side, applying a force to the spring rod. The solenoid valve however allows a flow of hydraulic oil both from the first hydraulic chamber to the second hydraulic chamber and vice versa.

An electrohydraulic tensioner of the type described may be controlled such that the compression of the spring is at least countered, preferably a compression of the spring is completely prevented. For this, the solenoid valve need merely be closed or held closed, wherein even a minimal compressibility of the hydraulic oil and leakage would make a minor undesirable compression of the spring possible or unavoidable.

The spring rod exposed to the force of the hydraulic oil can then preferably not penetrate into the housing. Compression of the spring and hence movement of the tensioning means under the load of the belt is not possible or becomes more difficult. On simultaneous expansion of the spring however, the spring rod can be moved in translation, whereby hydraulic oil flows via the check valve from the first hydraulic chamber into the second hydraulic chamber. The tensioning means or wheel shifts further into the belt, tensioning the belt.

A starter assigned to the belt drive is frequently provided in addition to a conventional starter, in order to initiate or allow a restart of the internal combustion engine via the belt drive.

Restarting the internal combustion engine is becoming increasingly important since, in the development of internal combustion engines, the constant aim is to minimize fuel consumption and one concept for reducing fuel consumption is to switch off the internal combustion engine when there is no momentary power demand, instead of continuing to operate this on idle (start-stop strategy). In practice, this means that at least when the vehicle has stopped, the internal combustion engine is switched off, i.e. is out of operation, that is unpowered. One application is stop-and-go traffic, as occurs for example in traffic jams on motorways and trunk roads. In urban traffic, stop-and-go traffic is no longer the exception but rather the rule, because of the traffic light systems present which are not harmonized with each other and the increased traffic density.

If the internal combustion engine is to be switched off to reduce fuel consumption when there is no power demand, immediately before the internal combustion engine is switched off, the active tensioner can be operated such that a compression of the spring is prevented and the belt is tensioned by further insertion of the tensioning means. This is carried out in anticipation of the restart which requires a sufficient minimum tension in the belt to start the internal combustion engine again, i.e. restart it, using the starter assigned to the belt drive.

Turning now to FIG. 2A, it shows a schematic of an example belt drive 201 that may be included in the engine 10 described above with reference to FIG. 1. The belt drive 201 comprises a belt 202, a first wheel 204 arranged on the crankshaft 80, and two further wheels, namely a second wheel 206 arranged on a shaft 207 of a further ancillary device, and a third wheel 208 arranged on the shaft 209 of a starter 210. Optionally, an idler wheel 211 may be provided (shown in dotted lines).

The belt drive 201 includes a tensioner 212 for adjusting the tension of the belt 202. As described in greater detail below in the example of FIG. 2B, the tensioner 212 may be an electrohydraulic tensioner. The tensioner 212 comprises, as a tensioning means, a wheel 214 which is received rotatably by a pivotable lever 216 which is mounted fixedly on the engine at one end and at its other, freely pivotable end is connected in articulated fashion to a spring rod 218. The spring rod 218, movable in translation, guides a spring 220 which exerts a force on the wheel 214 and presses it into the belt 202, forming a contact zone. The wheel 214 engages in the belt 202 and tensions the belt 202 in this manner. The wheel 214 may also be referred to herein as a movable tensioner pulley 214.

In the present case, the starter 210 assigned to the belt, after restarting the internal combustion engine, may also be used as a generator, namely as an alternator. Thus, the starter 210 may comprise an integrated starter-generator (ISG). As such, starter 210 may also be referred to herein as ISG 210. During an engine start/restart, the starter 210 may therefore provide torque to the engine 10 and rotate the engine 10 via the belt 202. In such example, the third wheel 208 arranged on the shaft 209 of the starter 210 drives rotation of the first driving wheel 204 and the crankshaft 80. However, during engine operation when the crankshaft 80 provides torque input to the starter 210 to power electrical devices of the vehicle, then third wheel 208 is driven by the crankshaft 80 via the belt 202 of the belt drive 201.

The belt 202 is guided around the driving first wheel 204 and the two other wheels 206 and 208, and tensioned, i.e. held tight under spring force of the spring 220 of the tensioner 212, during operation of the internal combustion engine.

In order to tension the belt 202 of the internal combustion engine which is not in operation (e.g., not spinning), the belt 202 is excited to vibration, i.e. set in vibration, by means of the starter 210. The wheel 214 exposed to the force of the spring 220 is moved then in steps in the direction of the belt 202 and the belt 202 is tensioned.

In particular, as the spring 220 expands, it pushes the wheel 214 into the belt 202 via the pivotable lever 216. Thus, as the spring 220 expands, it extends the spring rod 218, which in turn pivots the lever 216, which pushes the wheel 214 further into the belt 202. The belt 202 comprises a closed, continuous loop that encloses an area. The cross-sectional area enclosed by the belt 202 decreases as the wheel 214 is pushed further into the belt 202. Thus, the tensioner 212 increases belt tension, and in doing so decreases the area enclosed by the belt 202, by pushing the wheel 214 further into the belt via the spring 220. Thus, the tensioner 212 passively adds tension to the belt 202 via the spring 220.

However, the spring force of the spring 220 may be such that the spring 220 only adds tension to the belt 202, when the tension in the belt 202 decreases. Thus, the tensioner 212 may maintain the position of the spring 220 and spring rod 218, but may not adjust the position of the wheel 214 unless the tension in the belt 202 decreases.

Controller 20 may be in electrical communication with the tensioner 212 and/or with the ISG 210. The controller may maintain the position of the tensioner 212 by closing a solenoid valve of the tensioner 212 as shown in greater detail below with reference to FIG. 2B. Thus, the controller 20 may send electrical signals to the solenoid valve to close, to maintain the position of the tensioner 212. In the description herein, the closing of the solenoid valve may also be referred to as locking of the tensioner 212, as closing of the solenoid valve prevents the spring from compressing and the rod 218 from retracting into the body of the tensioner 212. For example, the controller 20 may close the solenoid valve prior to an engine stop, to maintain belt tension during the engine stop, so that the belt 202 has enough tension to start the engine 10 during a subsequent engine start.

Figure 3:
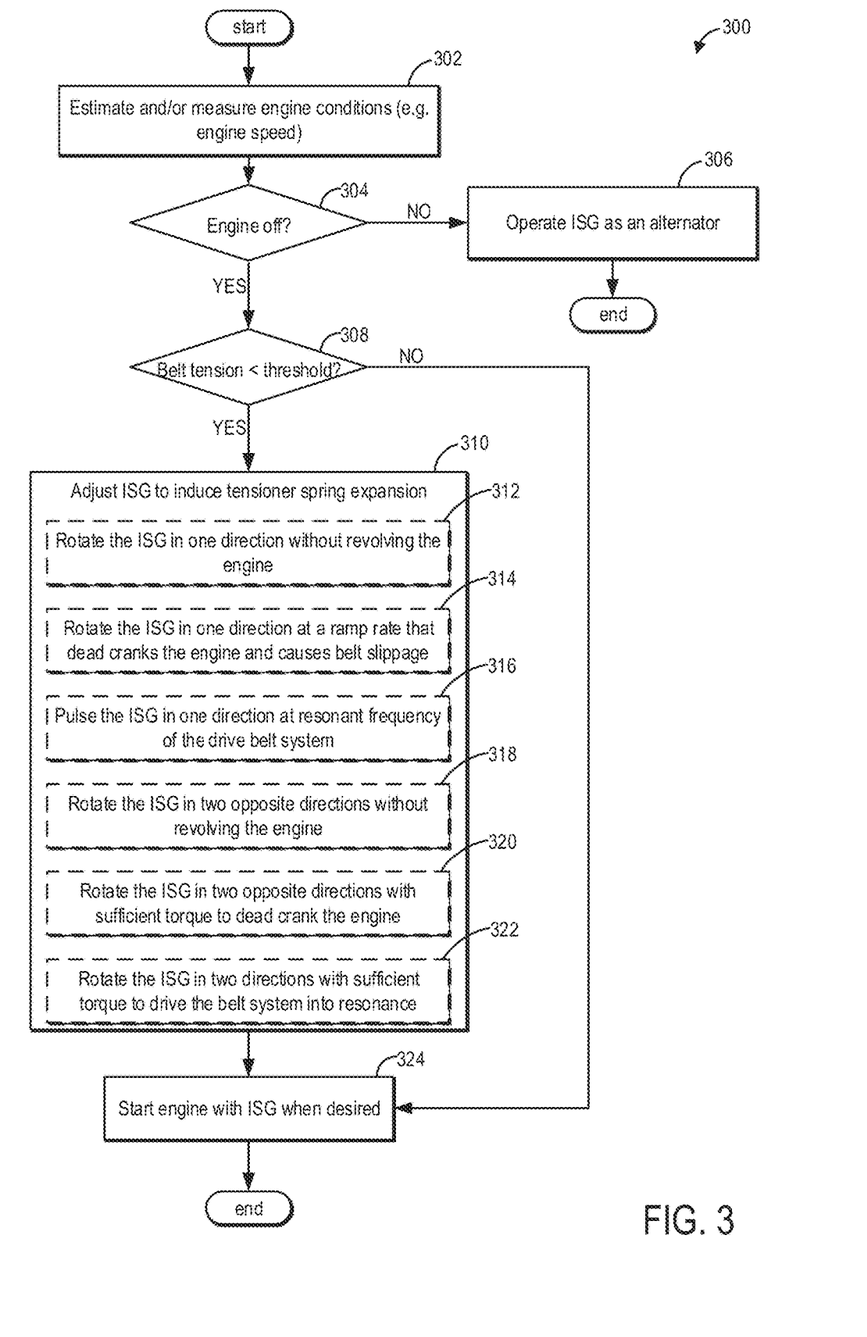
FIG. 3 shows a flow chart of an example method for tensioning a belt of a belt drive, such as the belt drive of FIG. 2A, in accordance with an embodiment of the present disclosure.

However, when the engine is off and the tension of the belt 202 is not sufficient for the ISG 210 to start the engine 10, the controller 20 may send signals to the ISG to vibrate the belt 202 to encourage movement of the wheel 214 into the belt 202 to increase the tension of the belt 202. For example, the controller 20 may pulse on the ISG to vibrate the belt 202. FIG. 3 describes further methods for vibrating the belt and increasing belt tension while the engine is off and not spinning.

Turning to FIG. 2B, it shows diagrammatically an embodiment of the tensioner 212. This spring rod 218, movable in translation, is mounted in a housing 230 of the tensioner 212, wherein at least two hydraulic chambers 231 and 232 are provided in the housing 230 which can be connected via a check valve 234 and a solenoid valve 236.

The check valve 234 allows the flow of hydraulic oil in one direction only, namely from a first hydraulic chamber 231 to a second hydraulic chamber 232 which is arranged on the spring rod side, applying a force to the spring rod 218. The solenoid valve 236 however allows a flow of hydraulic oil both from the first hydraulic chamber 231 to the second hydraulic chamber 232 and vice versa.

An electrohydraulic tensioner 212 of the type described may be controlled such that the compression of the spring 220 is at least countered, preferably a compression of the spring 220 is completely prevented. For this, the solenoid valve 236 need merely be closed or held closed, wherein even a minimal compressibility of the hydraulic oil and leakage would make a minor undesirable compression of the spring 220 possible or unavoidable.

The spring rod 218 exposed to the force of the hydraulic oil can then preferably not penetrate into the housing. Compression of the spring 220 and hence movement of the tensioning means under the load of the belt is not possible or becomes more difficult. On simultaneous expansion of the spring 220 however, the spring rod 218 can be moved in translation, whereby hydraulic oil flows via the check valve 234 from the first hydraulic chamber 231 into the second hydraulic chamber 232. The tensioning means or wheel shifts further into the belt, tensioning the belt.

The controller 20 may be in electrical communication with the solenoid valve 236 for adjusting the position thereof. Thus, the controller 20 may close the solenoid valve 236 to prevent the flow of fluid from the second hydraulic chamber 232 to the first hydraulic chamber 231. By closing the solenoid valve 236, the controller may prevent compression of the spring 220 and retraction of the spring rod 218. Thus, the controller 20 may maintain the position of the spring rod 218, and thereby maintain belt tension by closing the solenoid valve 236. Thus, the spring 220 passively expands and adds tension to the belt when the tension in the belt decreases. The controller 20 may then hold and/or maintain the position of the spring 220 by closing the solenoid valve 236.

Turning now to FIG. 3, it shows a method 300 for tensioning a belt (e.g., belt 202 described above in FIGS. 2A and 2B) of a belt drive (e.g., belt drive 201 described above in FIG. 2A) of an engine (e.g., engine 10 described above in FIGS. 1 and 2A). In particular, the method 300 may be used to increase belt tension while the engine is not running. A controller (e.g., controller 20 described above in FIGS. 1-2B) may include the method 300 stored in non-transitory memory, and may execute method 300 in response to signals received from various engine sensors. The controller may adjust operation of a starter (integrated starter-generator 210 described above in FIG. 2A) to vibrate and/or flutter the belt to induce movement of a tensioner (e.g., tensioner 212 described above in FIGS. 2A and 2B) towards a more extended position that increases the tension of the belt.

Method 300 begins at 302 which comprises estimating and/or measuring engine operating conditions. Engine operating conditions may comprise one or more of engine speed, engine load, driver demanded torque, auxiliary loads, etc. In particular, the controller may receive an indication of engine speed from a crankshaft speed sensor (e.g., Hall effect sensor 118 described above in FIG. 1).

Method 300 then continues from 302 to 304 which includes determining if the engine is off. The controller may determine whether the engine is off based on the speed of the engine as estimated based on outputs from the crankshaft speed sensor. If the engine is not off (e.g., it is spinning), then method 300 continues from 304 to 306 which includes operating the integrated starter-generator as an alternator. Thus, a crankshaft (e.g., crankshaft 80 described above in FIGS. 1 and 2A) may drive rotation of the ISG and power various electrical devices. Method 300 then ends.

Alternatively, at 304, if the engine is off, method 300 then continues to 308 which comprises determining if the tension of the belt is less than a threshold. The threshold tension of the belt may represent a minimum tension needed to start the engine. Thus, if the belt tension is less than the threshold, the ISG may be unable to crank the engine to a speed sufficient to begin combustion. As one example, the tension of the belt may be less than the threshold when the engine stops unexpectedly, such as after an engine stall. Thus, if the controller was unable to close a control valve (e.g., solenoid valve 236 described above in FIG. 2B) prior to the most recent engine stop, then it may be determined that the belt tension is less than the threshold. However, if the most recent engine stop was anticipated, such as during start-stop operation where the controller initiated the engine stop and closed the solenoid valve prior to the engine stop, then the belt tension may be greater than the threshold.

If the belt tension is not less than the threshold, then method 300 continues to 324 which comprises starting the engine with the ISG when desired. For example, the controller may command the ISG to crank the engine in response to an increase in driver demanded torque, such as from a depression of an accelerator pedal. Method 300 then ends.

Alternatively at 308, if the tension of the belt is less than the threshold, then method 300 continues to 310 which comprises adjusting the ISG to induce a spring (e.g., spring 220 described above in FIGS. 2A and 2B) of the tensioner to expand. In particular, the method 300 at 310 comprises adjusting the ISG such that it induces vibration/flapping of the belt, which induces expansion of the spring of the tensioner. Specifically, the controller may repeatedly pulse the ISG. For example the controller may switch back and forth between powering on and powering off the ISG. In another example, the controller may repeatedly switch the direction of rotation of the ISG.

The controller may adjust the ISG operation by adjusting a power command signal (e.g., amount of electrical power) sent to the ISG. For example, the controller may adjust ISG operation by adjusting the duty cycle of a pulse-width modulated signal sent to the ISG. Thus, the controller may adjust the rotational direction and/or rotational speed/torque output from the ISG by adjusting the electrical signals sent to the ISG. The controller may excite the belt to vibrate via the starter for a predetermined duration such as an amount of time, a number of engine cycles, a number of engine revolutions, etc., or the controller may excite the belt to vibrate until the belt tension reaches the threshold.

Thus, the controller, by reversing ISG rotational direction, and/or pulsing the ISG on and off, may repeatedly relax and re-tighten the belt around the tensioner pulley. In doing so, the periodic tightening and relaxing of the belt around the tensioner pulley, induces the tensioner pulley to move deeper into the belt via the biasing force of the spring, reducing the area enclosed by the belt and further tightening the belt.

As explained above with reference to FIGS. 2A and 2B, expansion of the spring may cause a movable tensioning pulley (e.g., wheel 214 described above in FIG. 2A) to move into the belt, transverse to a direction of rotation of the belt, thereby reducing the area encompassed by the belt and increasing belt tension. Thus, the method 300 at 310 comprises increasing belt tension by adjusting the ISG such that is causes vibration and/or oscillating of the belt.

As one example, the method 300 may comprise inducing tensioner spring expansion by rotating the ISG in one direction without revolving the engine as indicated at 312. For example, the method 300 may comprise rotating the ISG in a direction that pushes the belt against the biasing force of the spring (e.g., clockwise in the example belt drive configuration of FIG. 2A) and stretches the belt over the tensioning pulley for a first duration. Method 300 comprises powering the ISG such that it applies a torque that is less than the breakaway torque of the engine. After applying the torque for the duration, the ISG may then be powered off (e.g., commanded to apply zero torque) for a second duration. The controller may then repeatedly power on and power off (e.g., pulse) the ISG in the manner described above until the tension in the belt increases above the threshold. Pulsing on the ISG in the manner described above, may periodically relax the belt, allowing the tensioner spring to expand, and push the tensioner pulley deeper into the belt, increasing the tension of the belt. The first and second duration may comprise an amount of time and/or a number of engine cycles or engine revolutions.

As a second example, the method 300 may comprise inducing tensioner spring expansion by rotating the ISG in one direction at a ramp rate that dead cranks the engine and causes belt slippage as indicated at 314. The ramp rate may be a pre-set torque and/or voltage ramp rate. Due to the slippage of the belt, and oscillation of the revolving engine, the belt may flutter, forcing the spring to expand and push the tensioner pulley deeper into the belt, increasing the tension of the belt. The controller may power on the ISG at the ramp rate and then power off the ISG, repeatedly. The controller may power on the ISG for a first duration and then power off the ISG for a second duration, where the first and second durations may comprise one or more of a number of engine cycles, number of engine revolutions, amount of time, etc.

As a third example, the method 300 may comprise inducing tensioner spring expansion by pulsing the ISG in one direction at a resonant frequency of the drive belt system (e.g., belt drive 201 described above in FIG. 2A) as indicated at 316. The resonant frequency of the drive belt system may be determined based on the various natural frequencies of the components of the drive belt system. The resonating drive belt system may create belt vibration and flutter that induces expansion of the tensioner spring and pushes the tensioner pulley deeper into the belt, increasing the tension of the belt. The controller may power on the ISG for a first duration and then power off the ISG for a second duration, where the first and second durations may comprise one or more of a number of engine cycles, number of engine revolutions, amount of time, etc. The controller may continue to power on the ISG for a duration which may comprise one or more of a number of engine cycles, number of engine revolutions and an amount of time, or the controller may power on the ISG until the belt tension increases above the threshold. The controller may switch back and forth between powering the ISG at the resonant frequency of the ISG and powering off the ISG (e.g., 0 electrical power). The controller may power on and power off the ISG at a predetermined frequency which may comprise one or more of a number of engine cycles, number of engine revolutions, and an amount of time.

In the above examples, where the ISG is rotated in only one direction, the direction of rotation of the ISG may be the same as the direction of crankshaft motion when the engine is spinning and the crankshaft is driving rotation of the ISG.

As a fourth example, the method 300 may comprise inducing tensioner spring expansion by rotating the ISG in two directions without revolving the engine as indicated at 318. First, the controller may rotate the ISG in a first direction that relaxes the belt around the tensioner pulley (e.g., counter-clockwise in the example of FIG. 2A) and allows the spring to expand and push the tensioner pulley towards the belt. The controller may rotate the ISG in the first direction at a torque below the breakaway torque of the engine. Then, the controller may command the ISG to move in a second direction, opposite the first direction (e.g., clockwise in the example of FIG. 2A) to tighten the belt. The controller may repeatedly alter the direction of rotation of the ISG, such as in a pulsing manner to induce the tensioner pulley to travel deeper and deeper into the belt until the belt tension increases above the threshold. The controller may spin the ISG in the first direction for a first duration and then in the second direction for a second duration, and may repeatedly alter the direction back and forth between the first and second directions for an amount of time, number of engine cycles, number of engine revolutions, or until the belt tension increases to the threshold. The first and second durations may comprise one or more of a number of engine cycles, number of engine revolutions, amount of time, etc.

As a fifth example, the method 300 may comprise inducing tensioner spring expansion by rotating the ISG in two opposite directions with sufficient torque to dead crank the engine as indicated at 320. Thus, the controller may repeatedly reverse the direction of ISG rotation, as in step 318, except that the controller may supply sufficient power to dead crank the engine at 320. The belt flutter induced by the oscillation engine and crankshaft may induce expansion of the spring tensioner and push the tensioner pulley deeper into the belt, increasing the tension of the belt. The controller may spin the ISG in the first direction for a first duration and then in the second direction for a second duration, and may repeatedly alter the direction back and forth between the first and second directions for one or more of an amount of time, number of engine cycles, number of engine revolutions, or until the belt tension increases to the threshold. The first and second durations may comprise one or more of a number of engine cycles, number of engine revolutions, amount of time, etc.

As a sixth example, the method 300 may comprise inducing tensioner spring expansion by rotating the ISG in two opposite directions such that the belt drive system is in resonance as indicated at 322. Thus, the controller may alternate the direction of rotation of the ISG to bring the belt drive system into resonance. As explained above at step 316, the vibrating belt drive system may cause belt flutter that will induce expansion of the tensioner spring, and push the tensioner pulley deeper into the belt, increasing the tension of the belt. The controller may spin the ISG in the first direction for a first duration and then in the second direction for a second duration, and may repeatedly alter the direction for an amount of time, number of engine cycles, number of engine revolutions, or until the belt tension increases to the threshold. The first and second durations may comprise one or more of a number of engine cycles, number of engine revolutions, amount of time, etc.

In all of the above examples, the method 300 may additionally comprise at 310, adjusting the tensioner to a high tension mode. Adjusting the tensioner to the high tension mode may comprise closing a solenoid valve (e.g., solenoid valve 236 described above in FIG. 2B) of the tensioner so that the positions of the spring and rod (e.g., spring rod 218 described above in FIGS. 2A and 2B) are maintained as they extend outward, and away from a body (e.g., housing 230 described above in FIG. 2B) of the tensioner. The high tension mode may also be referred to herein as a "locked mode." Thus, with the solenoid valve closed, the spring rod of the tensioner is locked such that it is prevented from retracting within the housing of the tensioner. Thus, with the solenoid valve closed, the spring and rod of the tensioner can only extend.

Thus, the method 300 at 310 may additionally comprise only flowing fluid from a retraction first chamber (e.g., first hydraulic chamber 231 described above in FIG. 2B) to an expansion second chamber (e.g., second hydraulic chamber 232 described above in FIGS. 2B) of the tensioner. As the spring and rod extend due to relaxation of the belt, induced by pulsing of the starter motor (e.g., ISG), fluid flows from the first chamber to the second chamber and is prevented from flowing back into the first chamber by the closed solenoid valve, effectively maintaining the position of the spring and rod as they extend, and preventing them from retracting. In this way, the belt tension may be increased by vibrating/relaxing the belt, and the increased tension may be maintained by holding the solenoid valve closed.

Additionally, the controller may execute one or more, or any combination of the above six examples described in steps 312-322 for tensioning the belt while the engine is off, such as during an engine stop. The controller thus repeatedly pulses the ISG to induce belt vibration/flutter which in turn induces movement of the tensioner pulley towards the belt, reducing the area encompassed by the belt and increasing the tension of the belt. The controller continues to pulse the ISG until the belt tension is sufficient to start the engine. In another example, the controller may continue to pulse the ISG for a duration. The duration may be a number of engine cycle, an amount of time, etc.

After increasing the belt tension to the threshold at 310, method 300 then continues to 324 and the engine is started when desired with the ISG. Thus, the method 300 at 310 comprises not initiating cylinder combustion. In this way, the ISG may be powered on at 310, without initiating combustion of the engine. Method 300 then ends.

In this way, a method for tensioning a belt of a belt drive of an internal combustion engine not in operation and having a crankshaft, comprises in addition to a belt as a traction means a first driving wheel arranged on the crankshaft and a third wheel arranged on a shaft of a starter assigned to the belt drive, wherein the belt is guided around the driving first wheel and the third wheel, and a movable tensioning means assigned to an active tensioner is provided, which engages in the belt under application of force by a spring, forming a contact zone, and applies tensile forces to the belt along its longitudinal axis for tensioning, which is characterized in that the active tensioner is controlled such that a compression of the spring is at least countered, so that a movement of the tensioning means under the load of the belt is at least hindered, and then the belt is excited to vibration in the contact zone by use of the starter so that the tensioning means, exposed to the force of the spring, is moved further in the direction of the belt under expansion of the spring, whereby the belt is tensioned.

The method according to the invention uses the effect that the active tensioner, for example an electrohydraulic tensioner, can particularly advantageously tension the belt passively by means of springs if the belt is moved transversely to the running direction, i.e. it vibrates or oscillates. The tensioning means or wheel moves further into the belt as soon as the belt is relaxed under a movement transverse to the running direction, whereby finally the belt is tensioned in steps.

In order to utilize the effect described above however, first the necessary conditions must be created, i.e. the active tensioner must in a first method step be controlled such that a compression of the spring is at least countered, so that movement of the tensioning means under load on the belt is at least hindered or completely blocked.

Since, when the internal combustion engine is not in operation, the belt does not normally move, in particular not transversely to the running direction, measures must be taken with which such a movement is imposed on the belt. According to the invention, this is achieved using the starter which is present in any case. By means of the starter assigned to the belt, the belt is excited to vibration in the contact zone with the tensioning means, so that the tensioning means, exposed to the force of the spring, is moved further in the direction of the belt under an expansion of the spring. Tensioning of the belt is the result.

The method according to the invention is a method for tensioning a belt of the belt drive of an internal combustion engine which is not in operation. Thus the aim on which the invention is based is achieved.

Embodiments of the method are advantageous in which at least one further second driven wheel is provided which is arranged on a shaft of an ancillary device, whereby the belt is guided about the driving first wheel and the at least one further second driven wheel and the third wheel.

The individual variants of the method according to the invention differ essentially in that the actual manner in which a movement transverse to the running direction is imposed on the belt by means of the starter.

Moreover, embodiments of the method are advantageous in which the starter assigned to the belt also serves or can be used as a generator. Then the starter in its main function serves for re-starting in a start-stop strategy, and after starting it serves for example as an alternator, wherein the third wheel arranged on the shaft of the starter then constitutes a further driven wheel present in the belt drive.

Embodiments of the method are advantageous in which the active tensioner is an electrohydraulic tensioner.

Further advantageous embodiments of the method according to the invention are explained in connection with the subclaims.

Embodiments of the method are advantageous in which, for tensioning the belt, the active tensioner is first controlled such that a compression of the spring is prevented, so that a movement of the tensioning means under load on the belt is blocked.

With reference to an electrohydraulic tensioner, it has already been stated that even a minimal compressibility of the hydraulic oil and leakage make a slight undesirable compression of the spring possible or unavoidable. To this extent, the method variant concerned relates to a theoretically idealized objective, which should however be targeted since this variant is oriented towards an effective, rapid tensioning of the belt.

Different structures of the starter allow different method variants for tensioning the belt which are described briefly below. In particular, it is important whether the shaft of the starter can rotate only in one rotation direction which corresponds to the direction of rotation of the crankshaft of the powered internal combustion engine, and is referred to below as the first rotation direction, or can be rotated in both rotation directions, i.e. also in a second rotation direction which is oriented opposite the direction of rotation of the crankshaft of the powered internal combustion engine.

For tensioning a belt of a belt drive of an internal combustion engine not in operation, in which the shaft of the starter can only rotate in a first rotation direction, wherein this first rotation direction corresponds to the direction of rotation of the crankshaft of the powered internal combustion engine, method variants are advantageous in which in a first method step, the starter is activated to apply a pre-definable torque to the belt drive, wherein the pre-definable torque is selected smaller than a break-free moment at which the crankshaft is set in rotation, and then in a second method step, the torque applied by the starter to the belt drive is changed to excite the belt to vibrate in the contact zone.

In the present case, by means of the starter, a torque is applied to the belt drive without however setting the crankshaft in rotation. If this torque is then changed, i.e. varied, in a second method step, again by means of the starter, this torque change or load change in the contact zone to the tensioning means ensures a movement of the valve belt transverse to the running direction. The tensioning means or wheel then moves further into the belt and the belt is tensioned passively by means of the spring of the active tensioner.

In this context, method variants are advantageous in which in a first method step, the starter is activated to apply a pre-definable torque to the belt drive, wherein the pre-definable torque is selected smaller than a break-free moment at which the crankshaft is set in rotation, and then in a second method step, the starter is deactivated to end the application of a torque to the belt drive, whereby the torque applied to the belt drive is changed.

According to this method variant, the torque applied by the starter to the belt drive is changed in that the starter is deactivated. The torque applied to the belt drive is set to zero and the belt is fully relaxed.

In the present context, method variants are advantageous in which the first method step and the second method step are repeated with a frequency which corresponds to a resonant frequency of the belt drive. If a vibration is imposed on the belt by means of the starter, the amplitude of this vibration is at its greatest, i.e. very strong, when the excitation frequency corresponds to a resonant frequency of the belt drive. This procedure supports an effective, rapid tensioning of the belt and guarantees an adequate minimum tension.

In the present context, method variants may be advantageous in which the first method step and the second method step are repeated until a pre-definable minimum tension is achieved in the belt drive, and also method variants in which the first method step and the second method step are repeated until a pre-definable time interval has been exceeded.

For tensioning a belt of a belt drive of an internal combustion engine not in operation, in which the shaft of the starter can only rotate in one rotation direction, wherein this one rotation direction corresponds to the direction of rotation of the crankshaft of the powered internal combustion engine, methods may be advantageous in which the starter is activated to apply a torque to the belt drive which is greater than a break-free moment at which the crankshaft is set in rotation, so that the crankshaft rotates.

In the present case, by means of the starter a torque is applied to the belt drive which is sufficiently large to set the crankshaft in rotation. In other words, the starter is used to drag the unpowered internal combustion engine and drive the crank mechanism via the crankshaft.

The moving drive gear parts and the different gas forces in the cylinders of the internal combustion engine excite the crankshaft to vibration, in particular to rotary vibrations which alternately tension and relax the belt in the contact zone. As a result of this load change, the belt moves transversely to the running direction in the contact zone to the tensioning means. The tensioning means move further into the belt and tension the belt.

In this context, method variants may be advantageous in which the starter is deactivated again as soon as a pre-definable minimum tension is achieved in the belt drive, and also method variants in which the starter is deactivated again as soon as the crankshaft has performed a pre-definable number of rotations.

For tensioning a belt of a belt drive of an internal combustion engine not in operation, in which the shaft of the starter can also rotate in a second rotation direction oriented opposite the direction of rotation of the crankshaft of the powered internal combustion engine, methods may be advantageous in which the starter is activated and in a first method step, a pre-definable opposing torque is applied to the belt drive to relax the belt in the contact zone, wherein this pre-definable opposing torque acts in the second rotation direction and is selected smaller than a break-free moment at which the crankshaft is set in rotation, and then in a second method step, a pre-definable torque of the same direction is applied to the belt drive in order to tension the belt in the contact zone, wherein this pre-definable torque of the same direction acts against the second rotation direction and is selected smaller than a break-free moment at which the crankshaft is set in rotation.

In the present case, by means of the starter, first an opposing torque is applied to the belt drive, i.e. a torque oriented against the direction of rotation of the crankshaft of the powered internal combustion engine. The opposing torque ensures that the belt is relaxed in the contact zone to the tensioning means. The belt can be moved transversely to the running direction and consequently, the tensioning means or wheel exposed to the force of the spring moves further in the direction of the belt. Then a torque of the same direction is applied to the belt drive in order to tension the belt.

Both torques are selected smaller than a break-free moment at which the crankshaft is set in rotation, so that according to the method variant concerned, the crankshaft is stopped or remains stopped.

In the present case again, embodiments of the method are advantageous in which the first method step and the second method step are repeated with a frequency which corresponds to a resonant frequency of the belt drive.

In this context, method variants may be advantageous in which the first method step and the second method step are repeated until a pre-definable minimum tension is achieved in the belt drive, and also method variants in which the first method step and the second method step are repeated until a pre-definable time interval has been exceeded.

For tensioning a belt of a belt drive of an internal combustion engine not in operation, in which the shaft of the starter can also rotate in a second rotation direction oriented opposite the direction of rotation of the crankshaft of the powered internal combustion engine, methods may be advantageous in which the starter is activated to apply a torque to the belt drive which acts in the second rotation direction and is greater than a break-free moment at which the crankshaft is set in rotation, so that the crankshaft rotates.

In the present case, by means of the starter a torque is applied to the belt drive which is sufficiently large to set the crankshaft in rotation. In other words, the starter is used to drag the unpowered internal combustion engine and drive the crank mechanism via the crankshaft.

In contrast to the variants already described above, in which the crankshaft of the unpowered internal combustion engine is rotated by means of the starter in a direction which corresponds to the direction of rotation of the powered internal combustion engine, in the present case an opposing rotary movement in the other rotation direction is imposed on the crankshaft, i.e. opposite the usual rotation direction.

The opposing torque initially ensures that the belt relaxes in the contact zone to the tensioning means, whereby the tensioning means exposed to the force of the spring can move back in the direction of the belt and tension the belt.

Furthermore, the vibrations of the crankshaft, provoked by the moving drive gear parts and the different gas forces, again alternately tension and relax the belt in the contact zone, causing it to vibrate. The load change allows the tensioning means to move back into the vibrating belt and tension the belt.

In the present context, method variants may be advantageous in which the starter is deactivated again as soon as a pre-definable minimum tension is achieved in the belt drive, and method variants in which the starter is deactivated again as soon as the crankshaft has performed a pre-definable number of rotations.

In another representation, a method for an engine system comprises, during an engine stop, pulsing a starter motor to relax a belt of a belt drive around a tensioner pulley of the belt drive and induce extension of a tensioner spring. In a first example of the method, wherein the pulsing the starter motor comprises repeatedly switching an amount of power provided to the starter at a threshold frequency. A second example of the method optionally includes the first example and further includes, wherein the threshold frequency is the resonant frequency of the belt drive. A third example of the method optionally includes one or more of the first and second examples, and further includes, wherein the switching the amount of power provided to the starter comprises switching between zero power, and a non-zero power level. A fourth example of the method optionally includes one or more of the first, second, and third examples, and further includes, wherein the switching the amount of power provided to the starter motor comprises alternating a direction of rotation of the starter motor between a first direction and an opposite second direction. A fifth example of the method optionally includes one or more of the first, second, third, and fourth examples, and further includes, wherein the pulsing the starter motor further comprises limiting torque output from the starter motor to below the breakaway torque of the engine system such that a crankshaft does not rotate. A sixth example of the method optionally includes one or more of the first, second, third, fourth, and fifth examples, and further includes, wherein the pulsing the starter motor further comprises powering the starter motor to rotate a crankshaft such that rotation of the crankshaft induces relaxation of the belt around the tensioner pulley.

In another representation, an engine system may comprise a starter motor, and a controller with computer readable instructions stored in non-transitory memory for, prior to an engine start: varying an amount of power supplied to the starter motor to induce vibration of a belt of a belt drive of the engine system when a tension of the belt is less than a threshold.

A technical effect of reducing and/or eliminating engine start failures is achieved by a method for increasing belt tension during while an engine is not running. Thus, by modulating torque output from a vehicle starter, belt vibration and thus periodic belt relaxation may be induced, which in turn allows the spring of a hydraulic tensioner to expand and increase the tension of the belt. As such, the likelihood of a successful engine start, during a subsequent engine restart following an engine stop may be increased. Further, belt tension may be increased and/or maintained even when an engine stops unexpectedly prior to a vehicle controller locking the position of the belt tensioner.

It will be appreciated by those skilled in the art that although the present application has been described by way of example and with reference to the one or more examples above, it is not limited to the disclosed examples and that alternative examples could be constructed without departing from the scope of the present application as defined by the appended claims.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for tensioning a belt of a belt drive of an internal combustion engine not in operation and having a crankshaft, in addition to the belt as a traction means a first driving wheel arranged on the crankshaft and a third wheel arranged on a shaft of a starter assigned to the belt drive, wherein the belt is guided around the driving first wheel and the third wheel, and a movable tensioning means assigned to an active tensioner is provided, which engages in the belt under application of force by a spring, forming a contact zone, and applies tensile forces to the belt along its longitudinal axis for tensioning, comprising:
- controlling the active tensioner such that a compression of the spring is at least countered, so that a movement of the tensioning means under a load of the belt is at least hindered;
- and then exciting the belt to vibration in the contact zone by use of the starter so that the tensioning means, exposed to the force of the spring, is moved further in the direction of the belt under expansion of the spring, whereby the belt is tensioned
- wherein the belt is excited to vibration by
  - in a first step, the activating the starter to apply a pre-definable torque to the belt drive, wherein the pre-definable torque is selected smaller than a break-free moment at which the crankshaft is set in rotation; and
  - in a second step, changing the torque applied by the starter to the belt drive to excite the belt to vibrate in the contact zone
  - wherein the first step and the second step are repeated with a frequency which corresponds to a resonant frequency of the belt drive.

2. The method of claim 1, wherein at least one further, second driven wheel is provided which is arranged on a shaft of an ancillary device, wherein the belt is guided about the driving first wheel and the at least one further second driven wheel and the third wheel.

3. The method of claim 1, wherein the active tensioner is first controlled such that a compression of the spring is prevented, so that a movement of the tensioning means under relaxation of the belt is blocked.

4. The method of claim 1, wherein during the second step, the starter is deactivated to end the application of a torque to the belt drive, whereby the torque applied to the belt drive is changed.

5. The method of claim 1, wherein the first method step and the second method step are repeated until a pre-definable minimum tension is achieved in the belt drive.

6. The method of claim 1, wherein the first method step and the second method step are repeated until a pre-definable time interval has been exceeded.

7. The method of claim 1, wherein exciting the belt to vibration comprises activating the starter to apply a torque to the belt drive which is greater than a break-free moment at which the crankshaft is set in rotation, so that the starter rotates the crankshaft in only one rotation direction, wherein this one rotation direction corresponds to the direction of rotation of the crankshaft of the powered internal combustion engine.

8. The method of claim 7, wherein the starter is deactivated again as soon as one or more of a pre-definable minimum tension is achieved in the belt drive, and the crankshaft has performed a pre-definable number of rotations.

9. The method of claim 1, wherein the starter can rotate in a first rotation direction and in an opposite second rotation direction, the second rotation direction oriented opposite the direction of rotation of the crankshaft of the powered internal combustion engine, the exciting the belt to vibration comprises:
- activating the starter to apply a torque to the belt drive which acts in the second rotation direction and is greater than a break-free moment at which the crankshaft is set in rotation, so that the crankshaft rotates; and
- deactivating the starter again as soon as a pre-definable minimum tension is achieved in the belt drive, or deactivating the starter again as soon as the crankshaft has performed a pre-definable number of rotations.

10. A method for an engine system comprising: during an engine stop:
- pulsing a starter motor to relax a belt of a belt drive around a tensioner pulley of the belt drive and induce extension of a tensioner spring
- wherein the pulsing the starter motor comprises repeatedly switching an amount of power provided to the starter at a threshold frequency
- wherein the threshold frequency is the resonant frequency of the belt drive.

11. The method of claim 10, wherein the switching the amount of power provided to the starter comprises switching between zero power, and a non-zero power level.

12. The method of claim 10, wherein the switching the amount of power provided to the starter motor comprises alternating a direction of rotation of the starter motor between a first direction and an opposite second direction.

13. The method of claim 10, wherein the pulsing the starter motor further comprises limiting torque output from the starter motor to below a breakaway torque of the engine system such that a crankshaft does not rotate.

14. The method of claim 10, wherein the pulsing the starter motor further comprises powering the starter motor to rotate a crankshaft such that rotation of the crankshaft induces relaxation of the belt around the tensioner pulley.

15. A method for tensioning a belt of a belt drive of an internal combustion engine not in operation and having a crankshaft, in addition to the belt as a traction means a first driving wheel arranged on the crankshaft and a third wheel arranged on a shaft of a starter assigned to the belt drive, wherein the belt is guided around the driving first wheel and the third wheel, and a movable tensioning means assigned to an active tensioner is provided, which engages in the belt under application of force by a spring, forming a contact zone, and applies tensile forces to the belt along its longitudinal axis for tensioning, comprising:
- controlling the active tensioner such that a compression of the spring is at least countered, so that a movement of the tensioning means under the load of the belt is at least hindered;
- and then exciting the belt to vibration in the contact zone by use of the starter so that the tensioning means, exposed to the force of the spring, is moved further in the direction of the belt under expansion of the spring, whereby the belt is tensioned
- wherein the starter can rotate in a first rotation direction and in an opposite second rotation direction, the second rotation direction oriented opposite the direction of rotation of the crankshaft of the powered internal combustion engine,
- in a first step, applying a pre-definable opposing torque is to the belt drive to relax the belt in the contact zone, wherein this pre-definable opposing torque acts in the second rotation direction and is selected smaller than a break-free moment at which the crankshaft is set in rotation; and
- in a second step, applying a pre-definable torque of the same direction is applied to the belt drive in order to tension the belt in the contact zone, wherein this pre-definable torque of the same direction acts in the first rotation direction and is selected smaller than a break-free moment at which the crankshaft is set in rotation, and wherein one or more of the first step and the second step are repeated with a frequency which corresponds to a resonant frequency of the belt drive, the first step and second step are repeated until a pre-definable minimum tension is achieved in the belt drive, and the first step and second step are repeated until a pre-definable time interval has been exceeded.

* * * * *